United States Patent [19]

Iida et al.

[11] Patent Number: 5,009,929
[45] Date of Patent: Apr. 23, 1991

[54] PROCESS FOR THE PREPARATION OF MAGNETIC RECORDING MEDIUM

[75] Inventors: Shinobu Iida; Masaaki Fujiyama; Keisuke Yamada, all of Kanagawa, Japan

[73] Assignee: Fuji Photo Film Co., Ltd., Kanagawa, Japan

[21] Appl. No.: 533,991

[22] Filed: Mar. 26, 1990

Related U.S. Application Data

[63] Continuation of Ser. No. 181,937, Apr. 15, 1988, abandoned.

[30] Foreign Application Priority Data

Apr. 16, 1987 [JP] Japan .................................. 62-94740

[51] Int. Cl.$^5$ .................................................. B05D 5/12
[52] U.S. Cl. .................................... 427/130; 427/132; 427/289

[58] Field of Search ................. 427/130, 132, 289; 428/694, 900

[56] References Cited

U.S. PATENT DOCUMENTS

| | | | |
|---|---|---|---|
| 2,688,567 | 9/1954 | Franck | 427/130 |
| 3,069,815 | 12/1962 | Valentine | 427/130 X |
| 4,254,585 | 3/1981 | Schoettle et al. | 51/5 A |
| 4,557,947 | 12/1985 | Deimling et al. | 427/130 |

*Primary Examiner*—Bernard Pianalto
*Attorney, Agent, or Firm*—Sughrue, Mion, Zinn, Macpeak & Seas

[57] ABSTRACT

A process for the preparation of a magnetic recording medium comprises the steps of subjecting a magnetic recording layer coated on a nonmagnetic support to surface smoothening treatment, said magnetic recording layer comprising a ferromagnetic powder dispersed in a binder, and then abrading a surface of the magnetic recording layer by means of an abrasive tape.

7 Claims, 1 Drawing Sheet

PROCESS FOR THE PREPARATION OF MAGNETIC RECORDING MEDIUM

This is a Continuation of Application No. 07/181,937 filed Apr. 15, 1988 now abandoned.

BACKGROUND OF THE INVENTION

1. Field of the invention

The present invention relates to a process for the preparation of a magnetic recording medium basically comprising a nonmagnetic support and a magnetic recording layer provided thereon.

2. Description of prior art

A magnetic recording medium comprising a nonmagnetic support and a magnetic recording layer provided thereon is used as an audio tape, a video tape, or a recording medium for a computer system. The magnetic recording layer comprises a binder and a ferromagnetic powder dispersed therein.

The magnetic recording medium is generally prepared by the following process. A binder such as a resin component and a ferromagnetic powder are dispersed in a solvent to prepare a magnetic paint, and the magnetic paint is coated over a nonmagnetic support to form a layer of the magnetic paint on the nonmagnetic support. The coated layer of the magnetic paint is then subjected to various treatments such as magnetic orientation, drying treatment and surface smoothening treatment. Subsequently, the sheet having been subjected to such treatment steps is cut or slit into a desired shape to prepare a desired magnetic recording medium.

It is thought that the particles of the ferromagnetic powder are firmly kept in the recording layer of the magnetic recording medium prepared as above and the magnetic recording layer has a very smooth surface. According to studies of the present inventors, however, it has been confirmed that some particles of the ferromagnetic powder are insufficiently fixed to the recording layer and merely deposited on the surface of the recording layer. These insufficiently fixed ferromagnetic particles easily separate (drop off) from the recording layer and deposit on a surface of a magnetic head in the course of running procedure, to cause clogging on the head. Further, these particles sometimes cause occurrence of drop-out in the case of a video tape, etc. Moreover, such separation of the ferromagnetic powder from the recording layer reduces the amount of the ferromagnetic powder present in the vicinity of the surface of the magnetic recording layer, so that the resulting magnetic recording medium is lowered in the electromagnetic conversion characteristics (i.e., lowering of output level occurs) after repeated uses.

For solving the above-mentioned various problems such as occurrence of drop-out, clogging on a magnetic head and lowering of output level, the present inventors have invented a method of grinding the surface of a magnetic recording layer by means of a grinder and applied for a patent with respect to the method (U.S. Pat. Ser. No. 007,216).

According to the method, the surface of the magnetic recording layer which has been subjected to surface smoothening treatment is ground by means of a grinder of high hardness such as a diamond wheel or a fixed sapphire blade to remove particles of the ferromagnetic powder easily dropping off from the recording layer or the deposited material on the surface of the recording layer, so as to prevent separation of those particles or the deposited material from the recording layer in the course of running procedure.

SUMMARY OF THE INVENTION

It is an object of the present invention to provide a process for the preparation of a magnetic recording medium which is improved in running durability.

More particularly, the object of the invention is to provide a novel process for the preparation of a magnetic recording medium almost free from occurrence of drop-out and clogging on a magnetic head.

There is provided by the present invention a process for preparing of a magnetic recording medium which comprises the steps of subjecting a magnetic recording layer coated on a nonmagnetic support to surface smoothening treatment, said magnetic recording layer comprising a ferromagnetic powder dispersed in a binder, and then abrading the surface of said magnetic recording layer by means of an abrasive tape.

In the invention, the surface of a magnetic recording layer is abraded using an abrasive tape, and thereby the amount of a particulate component such as a ferromagnetic powder easily separating (i.e., dropping off) from the recording layer is reduced. Accordingly, thereby a magnetic recording medium less suffering clogging on a magnetic head and drop-out caused by the separated particles in the course of running procedure can be prepared. Further, since the particles of the ferromagnetic powder hardly drop off from the surface of the recording layer and hence the amount of the ferromagnetic powder hardly decreases even after repeated running, there can be obtained a magnetic recording SO medium showing little difference of reproduction output between the initial running and after the repeated running.

In the case that a curing agent is used as a component for the formation of a magnetic recording layer and that a portion of the curing agent remains in the unreacted state, most of the unreacted curing agent present in the vicinity of the surface of the recording layer can be removed by the abrasion treatment according to the invention, so that the resulting magnetic recording medium is almost free from adhesion of dust, etc. to the recording layer. Hence, a magnetic recording medium less suffering occurrence of drop-out caused by such deposition can be obtained. In addition, since a magnetic head is hardly stained with the unreacted curing agent, etc., a magnetic recording medium almost free from clogging on the head which is caused by deposition of dust on the head can be obtained.

DETAILED DESCRIPTION OF THE INVENTION

Figure 1:
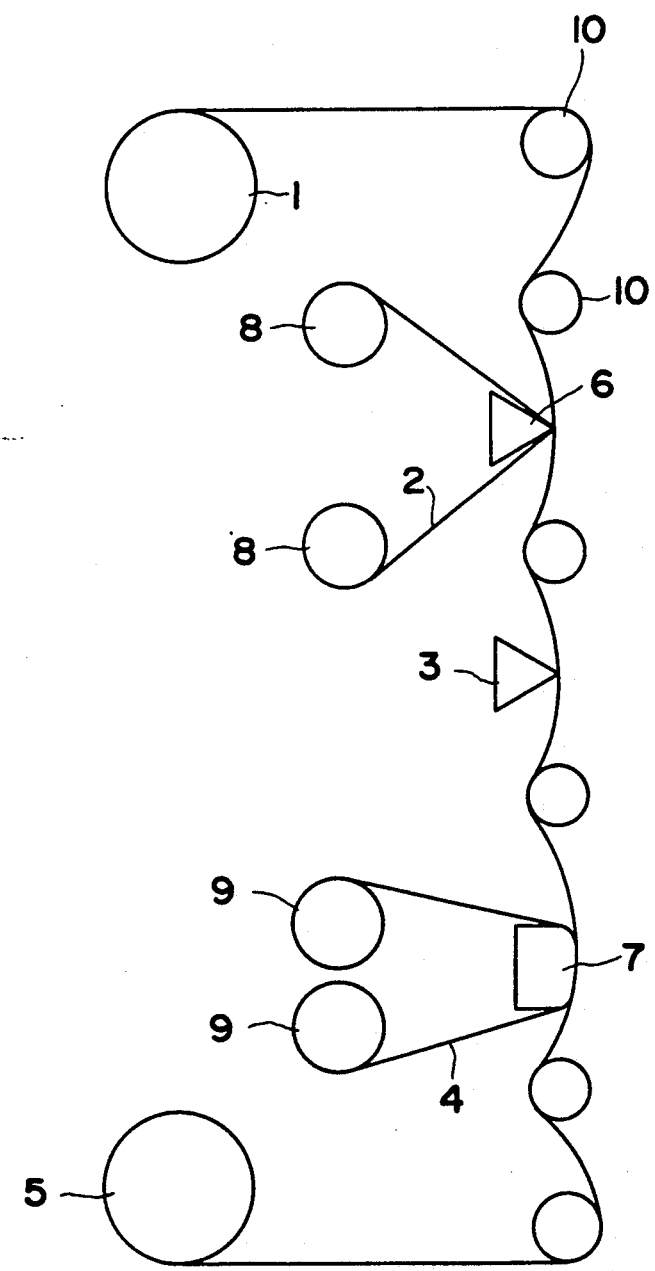
FIG. 1 schematically illustrates an example of the process comprising the steps of an abrasion treatment, a grinding treatment and a wiping treatment according to the present invention.

A magnetic recording medium is generally prepared by coating a magnetic paint over a nonmagnetic support to form a magnetic recording layer on the support, subjecting the magnetic recording layer to various treatments such as magnetic orientation., curing treatment and surface smoothening treatment, and then cutting or slitting the resulting sheet into a desired shape.

The magnetic recording medium comprises a nonmagnetic support and a magnetic recording layer provided on the support. The magnetic recording layer comprises a binder and a particulate component such as a ferromagnetic powder dispersed therein. The binder comprises a resin component and, if desired, a curing agent.

The provision of the magnetic recording layer on the nonmagnetic support can be done according to a conventional manner. For example, a resin component and a ferromagnetic powder (and a curing agent and an abrasive, if desired) are kneaded and dispersed in a solvent to prepare a magnetic paint, and the magnetic paint is then coated over the nonmagnetic support to form a magnetic recording layer on the support.

Examples of the nonmagnetic support employable in the invention include films or sheets of synthetic resins such as polyester resins (e.g., polyethylene terephthalate (PET) and polyethylene naphthalate), polyolefin resins (e.g., polypropylene), cellulose derivatives (e.g., cellulose triacetate and cellulose diacetate), vinyl resins (e.g., polyvinyl chloride and polyvinylidene chloride), polycarbonate resins, polyamide resins, polyamideimide resins and polyimide resins; nonmagnetic metal foils such as aluminum foil and copper foil; metal foils such as stainless foil; papers; and ceramic sheets.

The thickness of the nonmagnetic support is generally in the range of 3 to 50 $\mu$m, preferably in the range of 5 to 30 $\mu$m.

The resin component to be contained in the magnetic paint can be selected from those conventionally employed. Examples of the resin component include vinyl chloride copolymers (e.g., vinyl chloride/vinyl acetate copolymer, vinyl chloride/vinyl acetate/vinyl alcohol copolymer, vinyl chloride/vinyl acetate/acrylic acid copolymer, vinylidene chloride/vinyl chloride copolymer, vinyl chloride/acrylonitrile copolymer, ethylene/-vinyl acetate copolymer and vinyl chloride copolymer incorporated with a polar group such as —SO$_3$Na or —SO$_2$Na and an epoxy group), cellulose derivatives (e.g., nitrocellulose), acrylic resin, polyvinyl acetal resin, polyvinyl butyral resin, epoxy resin, phenoxy resin, and polyurethane resin (e.g., polyester polyurethane resin, polyurethane resin incorporated with a polar group such as —SO$_3$Na or —SO$_2$Na, and polycarbonate polyurethane resin).

In the case of incorporating a curing agent into the binder, a polyisocyanate compound is generally employed as the curing agent. The polyisocyanate compound employable in the invention can be selected from those generally used as a curing agent such as those used for curing a polyurethane resin. Examples of the polyisocyanate compound include a reaction product of 3 moles of tolylene diisocyanate and 1 mole of trimethylolpropane (e.g., Desmodule L-75 available from Bayer AG), a reaction product of 3 moles of diisocyanate (e.g., xylylene diisocyanate or hexamethylene diisocyanate) and 1 mole of trimethylolpropane, a buret adduct compound of 3 moles of hexamethylene diisocyanate, an isocyanurate compound of 5 moles of tolylene diisocyanate, an isocyanurate adduct compound of 3 moles of tolylene diisocyanate and 2 moles of hexamethylene diisocyanate, isophorone diisocyanate, and a polymer of diphenylmethane diisocyanate.

If a curing treatment is carried out by means of irradiation of electron rays, there can be done by employing a compound having a reactive double bond such as urethane acrylate as the curing agent.

In the invention, it is preferred to employ a resin having high hardness such as a vinyl chloride copolymer in combination with a resin having low hardness such as a polyurethane resin. In the case of using the combination of a resin having high hardness such as a vinyl chloride copolymer and a resin having low hardness such as a polyurethane resin as the resin component, the ratio between the former and the latter is generally in the range of from 9:1 to 5:5, preferably in the range of from 9:1 to 6:4, by weight.

The ratio between the above-mentioned resin component and the curing agent is generally in the range of from 9:1 to 5:5 (resin component: curing agent), preferably in the range of from 9:1 to 6:4, by weight.

In the case of using a ferromagnetic powder having low hardness, a larger amount of binder is generally used than the case of using a ferromagnetic powder having high hardness such as $\gamma$-Fe$_2$O$_3$. In this case, the amount of the flexible resin such as a polyurethane resin is generally increased.

If the amount of the polyurethane resin is increased as described above, the binder is apt to soften, so that the curing agent such as a polyisocyanate compound is generally used in a large amount to sufficiently cure the binder.

In the case of using a polyurethane resin as the resin component and a polyisocyanate compound as the curing agent, the ratio between the former and the latter is preferably in the range of from 1:0.8 to 1:2, more preferably in the range of from 1:1 to 1:5, by weight. By setting to the above-mentioned ratio in this range, the binder is effectively prevented from softening which is caused by the employment of the polyurethane resin even in the case of using a ferromagnetic metal powder having low hardness.

The total amount of the resin component and the curing agent is generally in the range of 10-100 parts by weight, preferably 15-40 parts by weight, based on 100 parts by weight of the employed ferromagnetic powder.

As a ferromagnetic powder employable in the invention, there can be mentioned a metal oxide-type ferromagnetic powder such as $\gamma$-Fe$_2$O$_3$, a modified metal oxide-type ferromagnetic powder such as $\gamma$-Fe$_2$O$_3$ containing other component such as cobalt, and a ferromagnetic metal powder containing a ferromagnetic metal such as iron, cobalt or nickel.

It is advantageous to apply the process of the present invention to the preparation of a magnetic recording medium comprising a ferromagnetic metal powder. Because the deposited component or dust on a magnetic recording layer or a magnetic head can be reduced in spite of using a large amount of curing agent, and accordingly the resulting magnetic recording medium less produces dropout phenomenon and hardly brings about clogging on the head.

The ferromagnetic metal powder employable in the invention may contain iron, cobalt or nickel, and has a specific surface area (S-BET) of not less than 42 m$^2$/g, preferably not less than 45 m$^2$/g.

As a typical ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni, Fe-Zn-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide.

Processes for the preparation of the above-mentioned ferromagnetic powders are already known, and the ferromagnetic powder employed in the invention can be prepared by the known processes.

There is no specific limitation with respect to the shape of the ferromagnetic powder employable in the present invention, but generally used is a ferromagnetic powder in a needle shape, a grain shape, a dice shape, a rice shape or a plate shape. Preferably employed is a ferromagnetic powder in a needle shape.

The above-mentioned resin component, curing agent and ferromagnetic powder are kneaded and dispersed in a solvent conventionally used in the preparation of a magnetic paint (e.g., methyl ethyl ketone, dioxane, cyclohexanone or ethyl acetate) to prepare a magnetic paint. Kneading and dispersing those components can be carried out according to a conventional manner.

The magnetic paint may contain other known additives such as an abrasive (e.g., $\alpha$-$Al_2O_3$ and $Cr_2O_3$), an antistatic agent (e.g., carbon black), a lubricant (e.g., fatty acid, fatty acid ester and silicone oil) and a dispersing agent, or a filler in addition to the abovementioned components. As the lubricant, a saturated fatty acid having 10-22 carbon atoms is preferably employed, because the saturated fatty acid is apt to be oriented in the form of layer on the surface of the magnetic recording layer through the grinding treatment using a rotatable blade-grinder (described hereinafter), and the layer of thus oriented fatty acid has high physical strength and high lubricity. As a result, the resulting magnetic recording medium is improved in running properties.

The magnetic paint prepared as above is coated over the aforementioned nonmagnetic support. The coating of the magnetic paint over the support can be done by a known method such as a method of using a reverse roll. The magnetic paint is coated in such a manner that the magnetic recording layer of the resulting recording medium would have thickness of 0.5-10 $\mu$m.

The nonmagnetic support may have a back layer (i.e., backing layer) on the opposite side of the side where a layer of the magnetic paint is to be coated. The back layer can be generally formed on the nonmagnetic support by coating a solution containing a particulate component (e.g., abrasive and antistatic agent) and a binder dispersed in an organic solvent over the surface of the nonmagnetic support where the magnetic paint is not coated.

An adhesive layer may be provided between the nonmagnetic support and the magnetic recording layer and/or between the nonmagnetic support and the back layer.

The coated layer of the magnetic paint is generally subjected to a treatment of orienting the ferromagnetic powder contained in the magnetic paint-coated layer, that is, a magnetic orientation, and then subjected to a drying process.

After the drying process is complete, the magnetic paint-coated layer is preferably subjected to a surface smoothening process. The smoothening process is carried out, for example, using a supercalender roll, etc. Through the surface smoothening process, voids having been produced in the magnetic paint-coated layer by removing the solvent in the drying process are filled with the ferromagnetic powder to increase a filling ratio of the ferromagnetic powder in the magnetic paint-coated layer, whereby a magnetic recording medium having high electromagnetic conversion characteristics is obtained.

In the process of the present invention, the surface of the magnetic recording layer and optionally the surface of the back layer which have been subjected to the surface smoothening process are subjected to an abrasion process using an abrasive tape. After the abrasion process using the abrasive tape, those surfaces of the magnetic recording layer and back layer are preferably ground or shaved by means of a rotatable blade-grinder and then wiped using a nonwoven fabric. The order of those processes such as the abrasion process, grinding process and the wiping process is by no means restricted to the above-mentioned order.

In the case of using a curing agent as a component of the binder of the magnetic recording layer, not smaller than 90 wt. % of the employed curing agent is contained in the magnetic recording layer in the unreacted state at the aforementioned surface smoothening stage, so that the magnetic recording layer is preferably subjected to the following curing treatment to cause the curing agent to react in an amount of not smaller than 50 wt. %, preferably not smaller than 80 wt. %, of the whole amount, and then subjected to the abrasion treatment.

As the curing treatment, there are two treatments of a heat curing treatment and a curing treatment by means of irradiation with electron rays (namely, an electron rays exposure-curing treatment). In the invention, any of those treatments can be utilized.

Through the curing treatment, the unreacted curing agent such as a polyisocyanate compound contained in the magnetic recording layer having been subjected to the surface smoothening process reacts with a resin component such as vinyl chloride copolymer and polyurethane resin to form a three dimensionally-cross-linked structure.

Processes for the heat curing treatment are already known, and the known processes can be applied to the present invention. For example, the heating curing treatment is generally carried out under the conditions of a temperature of not lower than 40° C. (preferably in the range of 50° to 80° C.) and a period of not shorter than 20 hours (preferably from 24 hours to 7 days).

Processes for the electron rays exposure-curing treatment are already known, and the known processes can be employed in the present invention.

The laminated sheet comprising the nonmagnetic support and the magnetic recording layer having been subjected the curing process is then slit or cut into a desired shape.

The procedure for slitting or cutting the sheet is generally done by a conventional method using a conventional cutting machine such as a slitter.

The laminated sheet is then abraded on the surface of the magnetic recording layer and optionally the surface of the back layer using an abrasive tape. The abrasion process is made by slowly running the abrasive tape under the condition of contacting the surface of the magnetic recording layer or the surface of the back layer with the surface of the abrasive tape. In this abrasion process, the abrasive tape is run at a speed of 1 to 3 cm/min in the direction opposite to the running direction of the laminated sheet.

FIG. 1 schematically illustrates one example of the process comprising the steps of the abrasion treatment, grinding treatment and the wiping treatment according to the present invention.

As shown in FIG. 1, a laminated sheet comprising a nonmagnetic support and a magnetic recording layer is sent from a sending roll 1. The surface of the magnetic recording layer of the running sheet is then successively subjected to an abrasion treatment using an abrasive tape 2, a grinding treatment using a fixed blade 3 and a wiping treatment using a nonwoven fabric 4. Thus treated sheet is then finally wound around a winding roll 5. An assisting roll 10 assists to smoothly move the laminated sheet.

The abrasive tape 3 is run at a speed of 1 to 3 cm/min in the direction opposite to the running direction of the laminated sheet by means of a roll 8, and pressed by means of a pad 6 to bring into contact with the surface of the magnetic recording layer. Thus, the abrasion of the surface of the magnetic recording layer is performed.

In FIG. 1, the surface of the magnetic recording layer may be abraded at two or more times by providing plural contact positions of the surface of the recording layer and the abrasive tape. In the case of abrading a surface of the back layer in addition to abrading the surface of the magnetic recording layer, the same abrading device comprising an abrasive tape, a roll for moving an abrasive tape and a pad is provided on the back layer-side of the laminated sheet.

The fixed blade 3 used for the grinding treatment is not always necessary in the invention, or may be replaced with a rotatable blade-grinder. Otherwise, both of the fixed blade and the rotatable blade-grinder can be used in the invention. For grinding the surface of the back layer, the fixed blade and/or the rotatable blade-grinder may be set on the back layer-side of the laminated sheet.

The nonwoven fabric 4 is moved at a speed of 0.5 to 10 cm/min in the direction opposite to the running direction of the laminated sheet by means of a roll 9, and pressed by means of a pad 7 to bring into contact with the surface of the magnetic recording layer. Thus, the wiping of the surface of the magnetic recording layer is performed.

The surface of the magnetic recording layer may be wiped at two or more times by providing plural contact positions of the surface of the recording layer and the nonwoven fabric. In the case of wiping a surface of the back layer in addition to wiping the surface of the magnetic recording layer, the same wiping device comprising a nonwoven fabric, a roll and a pad is provided on the back layer-side of the laminated sheet.

The abrasive tape employable for the abrasion treatment of the invention preferably is a tape used for abrading a magnetic head equipped in a cassette deck, a video deck, etc. The abrasive tape used for abrading a magnetic head mainly functions to satisfactorily finish the surface of a head, to provide a desired tip shape to a head, and to produce a head free from tipping.

The abrasive tape employable in the invention has a Mohs' scale of hardness in the range of 5 to 9, and contains at least one abrasive selected from the group consisting of $\alpha$-$Al_2O_3$, $SiO_3$, $Cr_2O_3$, $\alpha$-$Fe_2O_3$, diamond, $ZnO_2$ and $TiO_2$.

The abrasive tape employable in the invention can be prepared, for example, in the following manner.

The above-mentioned abrasive is dispersed in a binder solution containing a binder, and if necessary, other additives to prepare a coating solution, and the coating solution is coated over a support. The support having the coated layer is then dried and cut into a desired shape. As the binder, there can be employed theremoplastic resins, thermosetting resins and reactive resins. Those resins can be employed independently or in combination. The binder is employed in an amount of 10 to 200 parts by weight based on 100 parts by weight of the abrasive. The support material for the formation of the abrasive tape can be selected from films or sheets of synthetic resins such as polyester resins (e.g., polyethylene terephthalate) polyolefin resins (e.g., polypropylene), cellulose derivatives, vinyl resins, polycarbonate resins, polyamide resins; nonmagnetic metal foils such as aluminum foil and copper foil; metal foils such as stainless foil; papers; and ceramic sheets.

The abrasive tape employable in the invention preferably has a center line average height (Ra) ranging from 0.07 to 0.9. The center line average height of the abrasive tape is measured under the conditions of a cutoff value of 0.8 mm, an operation rate of 0.3 mm/sec., a needle pressure of 0.07 g., a needle diameter of 2 $\mu$mR, range of 20 kHz/0.5 mm using a center line average height measuring device (Safcom System of 400b, 403b and 404B).

There is no specific limitation on the abrasive tape employable in the invention, provided that the tape has the above-mentioned characteristics. As a matter of course, a commercially available abrasive tape can be also utilized in the invention.

By subjecting the surface of the magnetic recording layer to the above-mentioned abrasion treatment using an abrasive tape, a particulate component protruding from the surface of the recording layer (e.g., ferromagnetic powder or abrasive), a curing agent of unreacted state existing in the vicinity of the surface of the recording layer and a deposited material on the surface thereof (e.g., dust in air) are removed away from the surface of the recording layer generally with the binder, to highly smoothen the surface of the recording layer.

In the case of subjecting a surface of the back layer to the abrasion treatment, a particulate component such as particles of a nonmagnetic powder hardly separates (i.e., drops off) from the surface of the back layer, and hence the resulting magnetic recording medium in the form of tape does not suffer from occurrence of drop-out or clogging on a magnetic head caused by the deposition of the separated particles from the surface of the back layer even when the medium is stored in the wound state.

Subsequently, the surface of the magnetic recording layer and the surface of the back layer are preferably subjected to a wiping treatment. Examples of the wiping materials employable for the wiping treatment include a suede-type nonwoven fabric and a bonded nonwoven fabric. The suede-type nonwoven fabric is a fabric of single layer structure substantially not containing a binder such as polyurethane in which bundles of polyester fiber are finely interlocked (e.g., Exceine, trade name of Toray Industries, Inc. and Clarino, trade name of Kurare Co., Ltd.). The bonded nonwoven fabric is a fabric in which polyester fiber is bonded with a binder such as polyurethane (e.g., Vilene, trade name of Japan Vilene Co., Ltd). Through the wiping treatment, a deposited material or an organic material can be completely removed SO away from the surface of the magnetic recording layer and the surface of the back layer, and as a result, the resulting magnetic recording medium can be prominently reduced in occurrence of drop-out and clogging on a magnetic head.

The surface of the magnetic recording layer and the surface of the back layer are more preferably subjected to a grinding treatment prior to the above-mentioned wiping treatment. The method of grinding the magnetic recording layer and the back layer is described in Japanese Patent Application No. 61(1986)-13184. Examples of the grinders employable for the grinding treatment include a fixed blade, a diamond wheel and a rotatable blade-grinder. The fixed blade has a material of high hardness on the contact portion thereof with the recording layer or the back layer. Examples of the material of high hardness include sapphire, alumina, cermet, zirconia (zirconium oxide), silicon nitride, silicon carbide, diamond and hard alloys. The diamond wheel is a rotatable grinder in the form of cylinder having a sintered diamond on its outer surface. The rotatable blade-grinder is a grinder comprising a rotatable body having a circular section and at least one blade provided on the periphery of the body.

By performing the grinding treatment as described above, the effect given by the aforementioned abrasion treatment using an abrasive tape is more enhanced.

A method comprising subjecting the laminated sheet to surface smoothening treatment, cutting the sheet, and abrading the surface of the magnetic recording layer and the surface of the back layer using an abrasive tape, in this order, is described above, but this order is given by no means to restrict the process of the invention. For example, a process comprising a step for cutting or slitting and a step for abrading performed at the same place, or a method comprising a step for abrading arranged prior to the cutting or slitting process can be also utilized.

Further, even when the aforementioned curing treatment is not done, the curing reaction of the curing agent with the resin component proceeds, though its curing rate is very low, so that the cutting process and the abrasion process can be carried out after the surface smoothening process without performing the curing treatment.

The examples and the comparison example of the present invention are given below. In the following examples the expression "part(s)" means "part(s) by weight", unless otherwise specified.

EXAMPLE 1

The components for a magnetic paint indicated below were kneaded in a ball mill to give a magnetic paint.

| | |
|---|---|
| Ferromagnetic metal alloy powder (Fe—Ni alloy, Fe: 96 wt. %, Ni: 4 wt. %, specific surface area: 45 m²/g) | 100 parts |
| Vinyl chloride/vinyl acetate/maleic anhydride copolymer (400x110A, available from Nippon Zeon Co., Ltd., Japan) | 14 parts |
| Polyurethane resin (Niporan N-2304, available from Nippon Polyurethane Co., Ltd., Japan) | 12 parts |
| Polyisocyanate compound (Desmodule L-75, available from Bayer AG) | 12 parts |
| α-Alumina | 10 parts |
| Stearic acid | 5 parts |
| Butyl stearate | 6 parts |
| Carbon black | 1 part |
| Methyl ethyl ketone | 325 parts |

The obtained magnetic paint was adjusted on its viscosity, and then the magnetic paint was coated over a polyethylene terephthalate support (thickness: 10 μm) by means of a reverse roll in such a manner that the coated layer of the magnetic paint would have thickness of 3.0 μm.

Independently, the components of a coating solution of a back layer given below were kneaded in a ball mill to give a coating solution for a back layer.

| | |
|---|---|
| Carbon black (mean particle size: 0.05 μm) | 35 parts |
| α-Alumina (mean particle size: 0.15 μm, maximum particle size: 0.3 μm) | 1.8 parts |
| Nitrocellulose | 20 parts |
| Polyurethane resin (Niporan N-2304, available from Nippon Polyurethane Co., Ltd., Japan) | 10 parts |
| Polyisocyanate compound (Colonate L, available from Nippon Polyurethane Co., Ltd., Japan) | 10 parts |
| Methyl ethyl ketone | 600 parts |

The obtained coating solution was adjusted in its viscosity, and then the solution was coated over a back surface of the polyethylene terephthalate support having a coated layer of magnetic paint on other surface by means of a reverse roll in such a manner that the coated layer of the solution would have thickness of 0.7 μm.

The nonmagnetic support having the coated layer of the magnetic paint on one surface and the coated layer of the solution for a back layer on other surface was treated with an electromagnet at 3,000 gauss under wet condition to give magnetic orientation. After the coated layers were dried, the dried layer of the magnetic paint was subjected to supercalendering to give a laminated sheet comprising a nonmagnetic support, a magnetic recording layer and a back layer.

The laminated sheet was heated at 60° C. for 24 hours to cure the polyisocyanate compound contained in the magnetic recording layer, and the heated sheet was then slit into a width of 8 mm. Subsequently, the slit sheet was successively subjected to the following abrasion treatment using an abrasive tape containing $Cr_2O_3$ as an abrasive and having a center line average height (Ra) of 0.07 (K-10000 of Fuji Photo Film Co., Ltd.) and a wiping treatment using a suede-type nonwoven fabric, to prepare an 8 mm type video tape.

Abrasion treatment

As illustrated in FIG. 1, the abrasive tape 2 was run at a speed of 1.5 cm/min in the direction opposite to the running direction of the laminated sheet by means of a roll 8, and the abrasive tape was pressed by means of a pad 6 to be brought into contact with the surface of the magnetic recording layer of the sheet under running of the abrasive tape and the sheet, whereby the surface of the magnetic recording layer was abraded.

EXAMPLE 2

The procedure of Example 1 was repeated except for further subjecting the surface of the magnetic recording layer to the following grinding treatment using a sapphire blade after the abrasion treatment to prepare an 8 mm type video tape.

Grinding treatment using sapphire blade

A sapphire blade (width: 5 mm, length: 35 mm, available from Kyosera Co., Ltd.) having an angle of tip portion of 60° was brought into contact with the surface of the running magnetic recording layer at a contact angle of the blade and the recording layer of 80° under tension of 50 g/8 mm applied to the laminated sheet, to grind the surface of the magnetic recording layer. The contact of the sapphire blade with the magnetic recording layer was carried out once, using a set of four sapphire blades.

EXAMPLE 3

The procedure of Example 1 was repeated except for further subjecting the surface of the magnetic recording layer to the following grinding treatment using a diamond wheel after the abrasion treatment to prepare an 8 mm type video tape.

Grinding treatment using diamond wheel

A diamond wheel comprising an iron cylinder and a sintered diamond of 1.5 mm thick provided on an outer surface of the cylinder (diameter: 25 mm, width: 25.6 mm, grit: #2,000, available from Orient Daiya Co., Ltd., Japan) was rotated at 2,000 r.p.m. in the direction opposite to the running direction of the magnetic recording layer, and brought into contact with the surface of the recording layer of the laminated sheet at a contact angle of the wheel and the sheet of 80°, providing tension of 50 g/8 mm to the sheet, to grind the surface of the magnetic recording layer. The contact of the diamond wheel with the magnetic recording layer was carried out twice.

EXAMPLE 4

The procedure of Example 1 was repeated except for further subjecting the surface of the magnetic recording layer to the following grinding treatment using a rotatable blade-grinder after the abrasion treatment to prepare an 8 mm type video tape.

Grinding treatment using rotatable blade-grinder

A rotatable blade-grinder comprising a metal cylinder (length: 35 mm, outer diameter: 20 mm, inner diameter: 12 mm) and one sapphire blade having a length of 35 mm and a section of regular triangle (length of side: 5 mm) provided on the periphery of the cylinder at an angle of 65° was prepared.

The rotatable blade-grinder was rotated at 1,000 r.p.m. in the direction opposite to the running direction of the magnetic recording layer, and brought into contact with the surface of the recording layer of the laminated sheet at a contact angle of the grinder and the sheet of 120°, providing tension of 50 g/8 mm to the sheet, to grind the surface of the magnetic recording layer.

EXAMPLE 5

The procedure of Example 1 was repeated except for further subjecting the surface of the magnetic recording layer to both of the above-described grinding treatments using a rotatable blade-grinder and a sapphire blade after the abrasion treatment to prepare an 8 mm type video tape.

EXAMPLE 6

The procedure of Example 1 was repeated except for abrading the surface of the magnetic recording layer using an abrasive tape containing $Al_2O_3$ as an abrasive and having Ra of 0.07 (K-10000 of Fuji Photo Film Co., Ltd.) instead of the abrasive tape containing $Cr_2O_3$ as an abrasive and having Ra of 0.07 (K-10000 of Fuji Photo Film Co., Ltd.) and then subjecting the abraded surface of the recording layer to the above-described grinding treatment using a sapphire blade, to prepare an 8 mm type video tape.

COMPARISON EXAMPLE 1

The procedure of Example 1 was repeated except for not subjecting the surface of the magnetic recording layer to any of the abrasion treatment using an abrasive tape and the wiping treatment using a suede-type nonwoven fabric, to prepare an 8 mm type video tape.

The 8 mm type video tapes obtained in Examples 1 to 6 and Comparison Example 1 were evaluated on lowering of reproduction output, occurrence of clogging on a magnetic head and occurrence of drop-out according to the following tests.

Lowering of reproduction output

A signal was recorded on the video tape for 60 minutes using a commercial video tape recorder at 5° C. and 30%RH. The recorded signal was repeatedly reproduced at 10 times to measure the reproduction output. The reproduction output of each tape was expressed by a relative value of an output measured at the last reproduction based on the reproduction output measured at the first reproduction being 0 dB.

Occurrence of clogging on magnetic head

The video tape was run in the same manner as that for the evaluation of the lowering of reproduction output, to measure the number of times of instantaneous clogging. The results are classified into the following:
AA: instantaneous clogging times of 0 to 3;
BB: instantaneous clogging times of 4 to 10; and
CC: a great number of times of instantaneous clogging.

Occurrence of drop-out

A signal was recorded on the video tape using a commercial video tape recorder for 10 minutes, and the recorded signal was reproduced to measure the number of drop-out at 15 $\mu$s and $-18$ dB within one minute.

The results of the evaluations on the lowering of reproduction output, the occurrence of instantaneous clogging on the magnetic head and the occurrence of drop-out are set forth in Table 1.

TABLE 1

|  | Drop-out (particles/min.) 15 $\mu$s, $-18$ dB | Instantaneous Clogging | Reproduction Video Output (dB) |
| --- | --- | --- | --- |
| Example 1 | 30 | AA | $-3$ |
| Example 2 | 15–20 | AA | $-2$ |
| Example 3 | 10–15 | AA | $-1$ |
| Example 4 | 10–15 | AA | $-1$ |
| Example 5 | 4–7 | AA | 0 |
| Example 6 | 15–20 | AA | $-2$ |
| Com. Ex. 1 | 70–120 | BB-CC | $-6$ |

We claim:
1. A process for the preparation of a magnetic recording medium which comprises the steps of first supercalendering a magnetic recording layer coated on a non-magnetic support, said magnetic recording layer comprising a ferromagnetic powder dispersed in a binder, next abrading the treated surface of said magnetic recording layer by means of an abrasive tape containing an abrasive selected from the group consisting of $\alpha$-$Al_2O_3$, $SiO_2$, $Cr_2O_3$, $\alpha$-$Fe_2O_3$, diamond, $ZnO_2$, $TiO_2$, and then wiping the abraded surface of the magnetic recording layer using a nonwoven fabric.

2. The process as claimed in claim 1, wherein said magnetic recording layer further contains $\alpha\text{-}Al_2O_3$ or $Cr_2O_3$.

3. The process as claimed in claim 1, wherein said abrasive tape has a center line average height ranging from 0.07 to 0.9.

4. The process as claimed in claim 1, wherein said magnetic recording layer further contains an abrasive.

5. The process as claimed in claim 1, wherein said ferromagnetic powder is a ferromagnetic metal powder.

6. The process as claimed in claim 1 further comprising grinding the abraded surface of the magnetic recording layer by means of a blade or a rotatable blade-grinder, said grinding step being performed between the abrading step and the wiping step.

7. The process as claimed in claim 1, wherein said binder of the magnetic recording layer comprises a combination of a vinyl chloride copolymer and a polyurethane resin.

* * * * *